(12) United States Patent
Beauvy et al.

(10) Patent No.: US 9,517,852 B2
(45) Date of Patent: Dec. 13, 2016

(54) ULTRASONIC WELDING DEVICE

(71) Applicant: Sonimat, Lencloitre (FR)

(72) Inventors: Lionel Beauvy, Nantes (FR); Eric Violleau, Cuhon (FR)

(73) Assignee: SONIMAT, Lencloitre (FR)

( * ) Notice: Subject to any disclaimer, the term of this patent is extended or adjusted under 35 U.S.C. 154(b) by 0 days.

(21) Appl. No.: 14/673,999

(22) Filed: Mar. 31, 2015

(65) Prior Publication Data

US 2015/0274337 A1    Oct. 1, 2015

(30) Foreign Application Priority Data

Apr. 1, 2014   (FR) ...................................... 14 52856

(51) Int. Cl.
    *B32B 37/00*   (2006.01)
    *B65B 51/22*   (2006.01)
    (Continued)

(52) U.S. Cl.
    CPC ............. *B65B 51/225* (2013.01); *B29C 65/08* (2013.01); *B29C 65/18* (2013.01); *B29C 65/305* (2013.01); *B29C 65/72* (2013.01); *B29C 65/7451* (2013.01); *B29C 66/1122* (2013.01); *B29C 66/4312* (2013.01); *B29C 66/8145* (2013.01); *B29C 66/8161* (2013.01); *B29C 66/8163* (2013.01); *B29C 66/81415* (2013.01); *B29C 66/81431* (2013.01); *B29C 66/81451* (2013.01); *B29C 66/81465* (2013.01); *B29C 66/8225* (2013.01); *B29C 66/83221* (2013.01); *B29C 66/849* (2013.01); *B29C 66/8416* (2013.01); *B29C 66/92443* (2013.01); *B29C 66/92921* (2013.01); *B29C 66/9392* (2013.01); *B29C 66/93441* (2013.01); *B65B 51/303* (2013.01);
    (Continued)

(58) Field of Classification Search
    CPC ...... B65B 51/225; B65B 51/303; B29C 65/08; B29C 65/18; B29C 65/72; B29C 65/74; B29C 66/4312; B29C 66/433; B29C 66/8145
    USPC .................................. 156/73.1, 580.1, 580.2
    See application file for complete search history.

(56) References Cited

U.S. PATENT DOCUMENTS

| 6,110,089 A * | 8/2000 | Hatozaki ............... B65B 51/306 493/189 |
| 6,739,370 B2 * | 5/2004 | Melheim ............. B29C 66/8163 100/258 A |
| 7,950,208 B2 * | 5/2011 | Mancin ................... B29C 65/08 156/580.1 |

FOREIGN PATENT DOCUMENTS

| EP | 2113370 A1 | 4/2009 |
| EP | 2319766 A1 | 11/2011 |

OTHER PUBLICATIONS

Preliminary French Search Report for priority application FR 1452856, dated Nov. 12, 2014.

* cited by examiner

*Primary Examiner* — James Sells
(74) *Attorney, Agent, or Firm* — Cooper Legal Group, LLC

(57) ABSTRACT

Device (10) for ultrasonic welding of a flexible, notably tubular, structure (F), to be conformed into sachets, this device including at least two airgaps each defined between a sonotrode (20) and an anvil (30,40) carried by respective support structures (28,54) the distance between which varies between a close together welding position and a spaced apart flexible structure movement position, in which airgaps the flexible structure to be welded is intended to be received to produce at least two weld lines, wherein for each airgap an (Continued)

Figure 3:
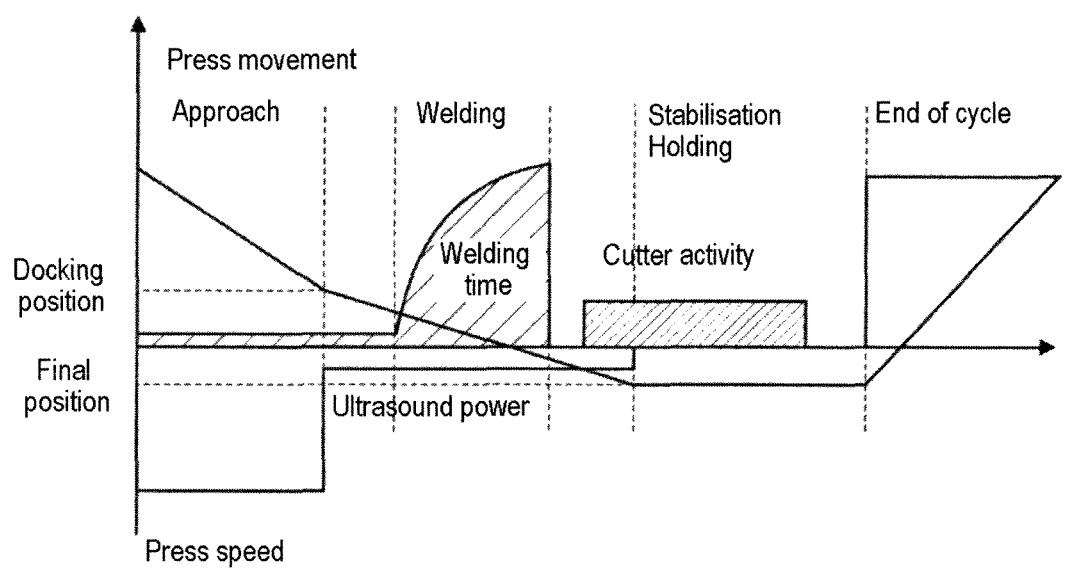

anvil and/or a sonotrode both associated with this airgap is at least partially mobile relative to a support structure (54) of this anvil or sonotrode.

21 Claims, 11 Drawing Sheets

(51) Int. Cl.
*B29C 65/08* (2006.01)
*B29C 65/18* (2006.01)
*B29C 65/30* (2006.01)
*B29C 65/72* (2006.01)
*B29C 65/74* (2006.01)
*B29C 65/00* (2006.01)
*B65B 51/30* (2006.01)
*B29L 31/00* (2006.01)
*B29C 65/78* (2006.01)
*B29K 705/02* (2006.01)

(52) U.S. Cl.
CPC ...... *B29C 65/7891* (2013.01); *B29C 66/4322* (2013.01); *B29C 66/71* (2013.01); *B29C 66/7234* (2013.01); *B29C 66/72321* (2013.01); *B29C 66/7352* (2013.01); *B29C 66/81417* (2013.01); *B29C 66/81811* (2013.01); *B29C 66/8242* (2013.01); *B29C 66/919* (2013.01); *B29C 66/91421* (2013.01); *B29C 66/91431* (2013.01); *B29C 66/9513* (2013.01); *B29C 66/9517* (2013.01); *B29K 2705/02* (2013.01); *B29L 2031/7128* (2013.01); *Y10T 156/12* (2015.01)

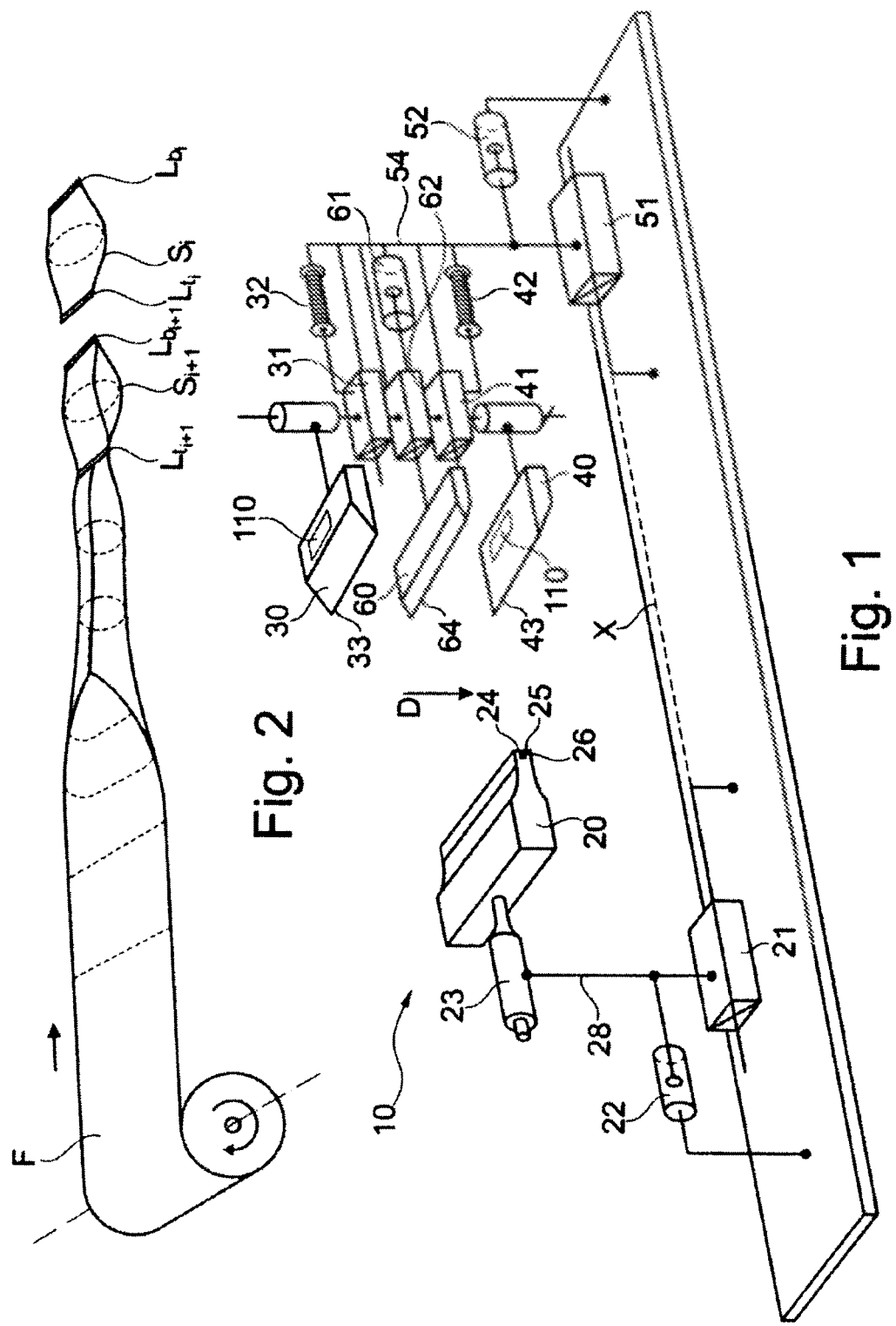

ULTRASONIC WELDING DEVICE

The present invention concerns an ultrasonic welding device, and more particularly but not exclusively, a device used in the context of packaging products in thermoplastic material sachets.

In the food environment in particular, the shelf life of the product in a sachet depends on the sealing of the sachet. This sealing is assured by the quality of the film used to produce it and by that of the welds effected to close the sachet. The latter contains not only the food product but often also an inert gas that prevents its oxidation. A defective weld leads to an exchange between the exterior and the interior, producing premature deterioration of the food.

In the case of packaging salad or raw vegetables in sachets, it is therefore standard practice to provide an operator to verify the correct sealing of the closure by pressing manually on each sachet, the latter being too fragile for this operation to be easily entrusted to an automatic machine.

Ultrasonic welding devices generally include a sonotrode and an anvil between which at least two thicknesses to be welded to one another are clamped.

The sonotrode produces vibratory energy that causes local fusion of the material along at least one weld line.

Various sonotrode and anvil geometries have been proposed, notably to produce two parallel weld lines, transverse to the direction of movement of the sachets to be welded. The first weld line closes the opening for filling the downstream sachet and the second closes the bottom of the upstream sachet, before it is filled.

The two weld lines are spaced by several millimeters in order to allow the action of a cutting blade that is used to separate the two sachets or to prepare for the separation of the two sachets.

The publications EP 1 354 693 A2, HR 2010 0498, DE 2004 013049, DE 102004013050 and US 2008/0105385 A1 describe ultrasonic welding devices including a sonotrode and a facing anvil.

In the application US 2008/0105385 A1, there is a double anvil, so as to produce the two weld lines, carried by an articulated support. A thrust member urges it in the direction of the sonotrode. A plurality of identical welding devices can be mounted side-by-side to weld a plurality of sachets in parallel.

To face up to the variability of the plastic films to be welded, and geometrical changes during a cycle, notably because of expansion phenomena, different industries have incorporated into the welding device a system for adjusting the distance between the anvil and the sonotrode, thus making it possible to guarantee correct welding throughout the spool, as shown by the publication US2009 250171 or JPS5787323.

Other systems have also been developed, as described in CN2016327761, enabling a constant force to be maintained with the aid of springs, to guarantee homogeneous clamping of the films to be welded.

All these devices simultaneously move the two counter-bearing surfaces facing the sonotrode and intended to produce the two weld lines.

Consequently, these systems necessitate fine adjustment of the parallel relationship between the sonotrode and these counter-bearing surfaces. Moreover, to maintain this parallel relationship during use of the machine, the system must be very robust and rigid. Any defect in the adjustment of the parallel relationship leads to a variation in the residual stress in the film and therefore impacts on the level of energy transferred by the sonotrode.

Another solution for reducing the risk of defective sealing consists in using a thicker film, less sensitive to parallelism defects, with the drawback of increasing the material cost and the carbon footprint.

U.S. Pat. No. 7,958,924 provides the possibility of mounting the double anvil for producing the weld lines on a pivoting support. The counter-bearing surfaces intended to come into contact with the film to be welded always move together, in the same way, accompanying the movement of the double anvil.

Application EP 2 113 370 discloses a device in which the anvil is mounted on ball-joints that allow it to pivot. The two weld lines are defined by raised patterns on the anvil that move with it and not independently of each other. Moreover, the presence of the ball-joints complicates manufacture.

There exists a requirement to increase production throughputs, reduce the material cost of the packaging whilst maintaining the reliability of the assembly at the required level.

The invention aims to improve further existing ultrasonic welding devices, and notably to provide the benefit of a welding device that is reliable, of high performance and remedies some or all of the drawbacks of the prior art.

It achieves this thanks to a device for ultrasonic welding of a flexible structure, including at least two airgaps each defined between a sonotrode and an anvil carried by respective support structures the distance between which varies between a close together welding position and a spaced apart flexible structure movement position, in which airgaps the flexible structure to be welded is intended to be received to produce at least two weld lines, wherein for each airgap an anvil and/or a sonotrode both associated with this airgap is at least partially mobile relative to a support structure of this anvil or sonotrode. If required, this enables one of the airgaps to vary differently from the other airgap during the welding operation. In particular, each anvil can move independently of the other anvil in contact with the flexible structure, which provides better compensation of any variations in the thickness of the latter than in the prior art.

By "at least partially mobile" is meant an overall mobility of the sonotrode or the anvil relative to the corresponding support structure, or only partial mobility. In the latter case, preferably confined to an anvil, the latter can be deformed to enable the surface coming to bear on the flexible structure to be retracted locally by the thrust exerted by the sonotrode. This possibility of deformation is obtained for example by creating one or more flexible areas within the anvil.

By "airgap" is meant the gap between a sonotrode and a facing anvil.

By "anvil" is meant the part of the device that defines the counter-bearing surface for the sonotrode during the welding operation.

The mobility of the sonotrode or the anvil relative to the support structure embodies at least one degree of freedom, and better two degrees of freedom, as described in detail hereinafter.

If the thickness of the flexible structure is constant, the surfaces of the sonotrode(s) and the anvil(s) coming to bear on the flexible structure may be parallel to a median plane for the flexible structure. If on the other hand the thickness of the flexible structure varies or product is present (for example a fragment of vegetable trapped between the thicknesses to be welded), at least one of the airgaps can be different from the other airgap during the welding operation in response to this variation in thickness and the two airgaps for example have different values over all their length, the values being constant for each airgap or variable along at least one airgap.

If the anvil or the sonotrode has a degree of freedom in translation from front to rear, this makes it possible to adapt to a variation in thickness in the longitudinal direction of the flexible structure. In this case, the anvils are retracted differently relative to the sonotrode during the welding operation, for example. A degree of freedom in rotation about an axis parallel to the direction of movement of the flexible structure makes it possible to adapt to a variation in thickness in the direction of the width of the flexible structure.

Thanks to the invention, it is therefore possible to weld a relatively thin flexible structure, in spite of its variability, whilst obtaining good sealing of the weld.

The invention is advantageously applied to the closure of sachets containing a food product such as salad leaves or raw vegetables, for example, or a powder product.

The possibility of different variation of one airgap relative to the other during the welding operation makes it possible to compensate defects in respect of the adjustment of the initial positioning of the anvil(s) relative to the sonotrode(s).

The initial adjustment of each airgap can therefore be less precise, which makes it possible to save time when starting up the device.

The invention enables reliable clamping of the thicknesses to be welded without generating stresses in said thicknesses that are too high or too low, in spite of any minor defects or changes of adjustment, which are inevitable in an industrial environment.

The invention further enables adjustment, notably automatic adjustment, of the clearance between the sonotrode and the anvil when each anvil comes to bear against the associated sonotrode via the thicknesses to be welded.

This makes it possible to circumvent any defect in the parallel relationship between the sonotrode and the anvil and to face up to variations in thickness in the length and/or width of the spool, as explained above, according to the degree(s) of freedom from which the sonotrode and/or the anvil benefit.

The thickness of the thermoplastic material film used to produce the sachets is from 5 to 1000 µm, for example, better from 20 to 200 µm, even better from 20 to 50 µm.

The two airgaps are preferably defined by the same sonotrode and by two anvils, which can move independently of each other relative to the sonotrode. It may be simpler to mount an anvil with one or two degrees of freedom relative to a corresponding support structure for a sonotrode, which is coupled to a generator that can prove relatively bulky.

There are several ways to move an anvil cyclically relative to a sonotrode, between a spaced-apart position allowing movement of the flexible structure and a close-together position during the welding operation.

The anvil(s) and the sonotrode(s) are preferably both moved cyclically, and preferably simultaneously, relative to a median plane, away from each other and toward each other, in this median plane. This makes it possible to move the flexible structure in a centered manner in this median plane, which facilitates the production of weld lines perpendicular to the direction of movement of the flexible structure.

The sonotrode(s) and the anvil(s) are therefore both preferably mobile in a direction substantially perpendicular to a direction of movement of the structure within the device.

Alternatively, it is possible to mount one or more sonotrodes on a fixed support and one or more anvils on a support mobile relative to that of the sonotrode(s). In this case, the movement of the support of the anvil(s) can push the flexible structure against the sonotrode(s).

Another possible variant is to mount one or more anvils on a fixed support structure and one or more sonotrodes on a support structure mobile relative to that of the anvil(s).

When the device includes one sonotrode and two anvils, at least one of the anvils is preferably movable in translation relative to the support structure that carries it in a direction moving it toward or away from the sonotrode, and more preferably each of the anvils is mobile in translation relative to the support structure in a direction moving it toward or away from the sonotrode.

An anvil and/or a sonotrode defining an airgap is preferably free to pivot, preferably in a plane perpendicular to a direction of movement of the flexible structure within the device. The gap defined between the anvil and the sonotrode can therefore vary in the direction of the width of the flexible structure, notably during the welding operation. This makes it possible to compensate any variation in the thickness of the flexible structure to be welded, which variation may be linked to the fact that the thickness of the film with which the structure is produced varies. This makes it possible to obtain a weld of good quality even when the thickness of the film is relatively small.

Each of the anvils and/or sonotrodes is preferably free to pivot, preferably in a plane perpendicular to a direction of movement of the structure within the device.

In a preferred embodiment of the invention, including two anvils each mobile relative to a support structure independently of the other, each anvil is therefore mounted to pivot relative to said support structure and the two anvils can pivot independently of each other relative to said support structure. The two anvils can pivot in respective planes that are parallel to each other.

The possibility of pivoting of the or each anvil and/or the or each sonotrode may be obtained by virtue of a guidance clearance of the or each anvil and/or the or each sonotrode relative to the corresponding support.

Guidance is obtained by guides sliding in bushes, for example, and sufficient radial play may be provided between the two to allow the required relative angular movement, which is preferably less than 5°.

Guidance is preferably provided by recirculating-ball carriages that are able to move on guide rails. For example, in this case, the carriages move with the anvils on the guide rails, which remain fixed relative to the support structure.

The possibility of pivoting of the anvil can therefore be obtained thanks to a guidance clearance between these rails and recirculating-ball carriages, of which there may be at least two or three per anvil.

During its movement along the guidance axis, the anvil or the sonotrode that is free to pivot can therefore move during the welding operation with a component in translation along the guidance axis and a component in rotation in the plane containing the guidance axis.

In the above preferred embodiment, each anvil can therefore slide with sufficient guidance clearance to allow a small angular relative movement, preferably less than 5° and more generally between 0.01 and 1°, in a plane that is substantially perpendicular to the direction of movement of the flexible structure in the airgap. If the anvil is initially horizontal, any pivoting thereof occurs in a horizontal plane. Pivoting in the top to bottom direction is of no benefit although it can result from the very fact of the mechanical freedom generated. It is best to block the latter as much as possible by guidance with a tolerance only in the required transverse direction. Each anvil then has two degrees of freedom relative to the support structure, one in translation, the other in rotation.

The benefit of using recirculating-ball carriages as mentioned above is that the latter allow angular relative movement in the plane of movement greater than the upward or downward relative movement.

The support structure of the anvils may include a crossmember that moves alternately in translation between a position near the sonotrode and a position away from the latter. This movement may take place at a variable speed, and notably at a reduced speed during the welding operation, when the sonotrode is giving out a higher energy.

The device preferably includes at least one elastic return member for urging the anvil and the sonotrode associated with the same airgap toward each other. More preferably, at least one of the anvils, and better each of the anvils, is elastically urged in the direction of the same sonotrode, preferably by at least one coil spring. At least one of the anvils, and better each anvil, is therefore advantageously urged in the direction of the sonotrode by at least two return springs, preferably coil springs, disposed on either side of a median plane of the anvil, which is for example a vertical plane when the anvil is horizontal. Each anvil may notably be spring-loaded by at least three springs, one of which has its axis situated in a median plane of the anvil and the other two of which are disposed symmetrically relative to this median plane. The use of at least three springs makes it possible to apply a well distributed force across the width of the flexible structure.

The springs are sized according to the pressure force required to effect the weld. The force necessary for the weld is generally a few Newtons per linear millimeter of weld. Commercial machines generally have welding widths between 5 and 400 mm, which preferably leads to forces per weld line of the order of approximately 200 to 3 000 N, depending on the thickness and the material of the film to be welded. Each spring can therefore exert a maximum force of 10.000 N on the anvil or the sonotrode, for example.

The invention makes it possible to propose tooling that is less rigid in that it is self-adapting by virtue of the fact of using controlled force elastic return means distributed across the welding area, notably the aforementioned springs.

The two anvils are preferably each guided by independent guide means and the force exerted by the springs or other elastic return members may be different for each anvil.

The device in accordance with the invention preferably includes means for adjustment of a rest position into which the anvil or the sonotrode is urged by the elastic return member(s) when the sonotrode and the anvil are spaced apart between two welding operations, notably screw-type stops.

Pre-setting the stops advantageously makes it possible to use a rough longitudinal parallel relationship. It may be provided by two screws one on each side of a median plane of each anvil serving as a stop against the thrust of the springs. The fact of loosening or tightening the right-hand side or the left-hand side therefore makes it possible to modify the initial parallel relationship between the sonotrode and the anvil. This makes it possible to minimize the depression necessary to obtain correct and rapid pressing against the flexible structure.

The device in accordance with the invention preferably includes at least part of a cutting device between the two anvils. This cutting device may be actuated to cut the flexible structure in two along a cutting line extending between the two weld lines associated with said anvils or to produce a pre-cut.

As seen in cross section, the surface of the anvil that is to come to bear against the surface to be welded preferably has a radius of curvature greater than or equal to 0.1 mm.

When the device includes two anvils and one sonotrode, the latter may have two advanced portions each of which faces a corresponding anvil and which define an airgap with a front edge of the latter. These two advanced portions may be separated by a groove that can accommodate the aforementioned cutting device.

When the device includes two sonotrodes, the latter may have a non-zero angle between their axes.

For example, one of the sonotrodes has its axis perpendicular to the direction of movement of the flexible structure in the airgap and the other sonotrode has its axis at an acute angle to the axis of the first sonotrode and lies in a plane perpendicular to the flexible structure in the airgap.

The two sonotrodes can have beveled edges intended to contact the flexible structure.

Each anvil is preferably temperature-regulated, notably by circulation of a fluid in at least one passage internal to the anvil.

The anvils preferably include heating means that make it possible to maintain them within a predefined temperature range, preferably between 10 and 30° C., when the welding device is operating, which may be in a relatively cold environment because of the foodstuffs nature of the packaged products, for example.

Generally speaking, it is therefore possible to regulate the temperature of the anvils either to cool them after the transfer of heat from the flexible structure with which they are in contact when it is melted or to heat them to prevent excessively fast cooling of the welded area that could lead to a modification in the level of crystallinity of the plastic material, modifying its physical-chemical properties. To this end, this temperature regulation is for example effected by means of a heat-exchange liquid circulating in cavities provided for this purpose in the anvils, as mentioned above, or by means of at least one heating element, for example one or more heating cartridges, inserted in or fixed externally to a surface of the anvil.

The ultrasound frequency is preferably between 15 and 80 kHz, better between 15 and 40 kHz, for example around 20 kHz, with peak-to-peak vibration amplitudes preferably between 5 and 200 µm, better between 20 and 80 µm.

Independently of or in combination with the above features, the invention consists in a device for ultrasonic welding of a flexible structure, including:
  a sonotrode, preferably of titanium alloy or more generally of metal, the latter optionally being coated or treated, entirely or partially,
  two anvils carried by a support structure, this support structure being mobile relative to the sonotrode between a spaced-apart position and a close-together position, at least one of the anvils being mobile relative to the support structure and caused to move relative to the latter by a thrust exerted by the sonotrode when the support structure is in the close-together position, and each anvil is preferably movable relative to the support structure by said thrust, the movement of the anvil(s) relative to the support structure preferably occurring against the return action of at least one elastic return member, more preferably with two degrees of freedom, one in translation and the other in rotation.

The invention further consists in a method of ultrasonic welding of a flexible structure by means of a device in accordance with the invention as defined above in which two parallel weld lines are produced simultaneously by clamping the structure to be welded in each airgap between the sonotrode and the corresponding anvil.

The flexible structure may be formed of a thermoplastic material film, notably a single-layer film. The thickness of the film may be between 10 and 100 microns as mentioned above, being of the order of 40 µm or less, for example.

The variation in the thickness of the film relative to its nominal thickness may exceed +/−5% over the length of the film but also over its width.

The sachets that are welded closed may contain a food product, notably salad leaves or raw vegetables or any other product, notably a powder product.

At least one of the anvils, and preferably each anvil, is preferably moved relative to a support structure of the anvil(s) by bearing indirectly against the sonotrode during the production of the weld lines.

Each anvil may be pressed against the sonotrode by a return force that maintains a constant or variable bearing pressure, as required.

During the operation of the device, in a preferred embodiment of the invention, the sonotrode depresses each anvil. When they move, the anvils may align with the sonotrode. The force applied to the anvils by the elastic return member (s) becomes the welding force.

Each weld line may extend over a distance between 5 and 400 mm.

The temperature of the anvils is preferably regulated, as mentioned above.

Figure 4:
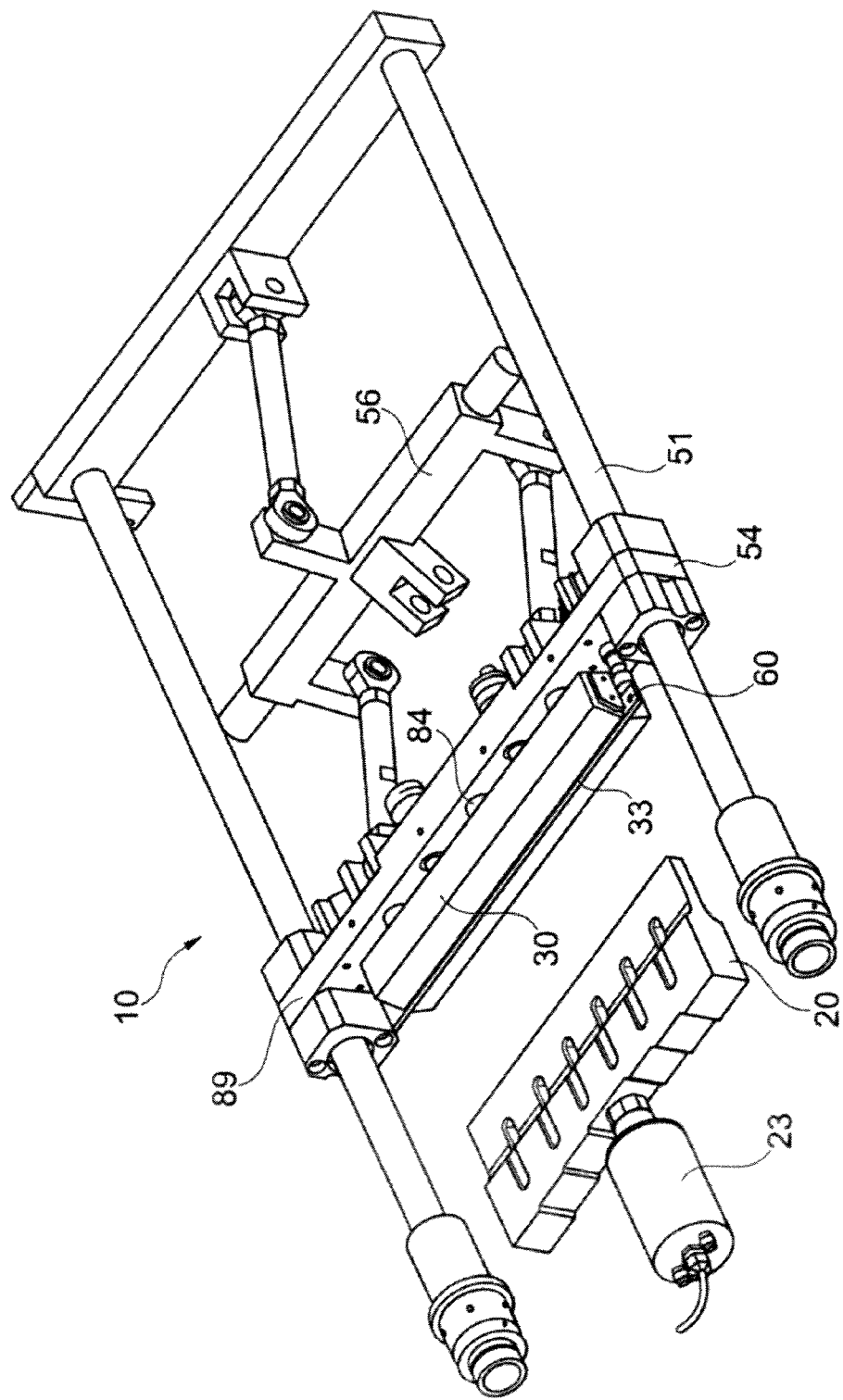
Figure 5:
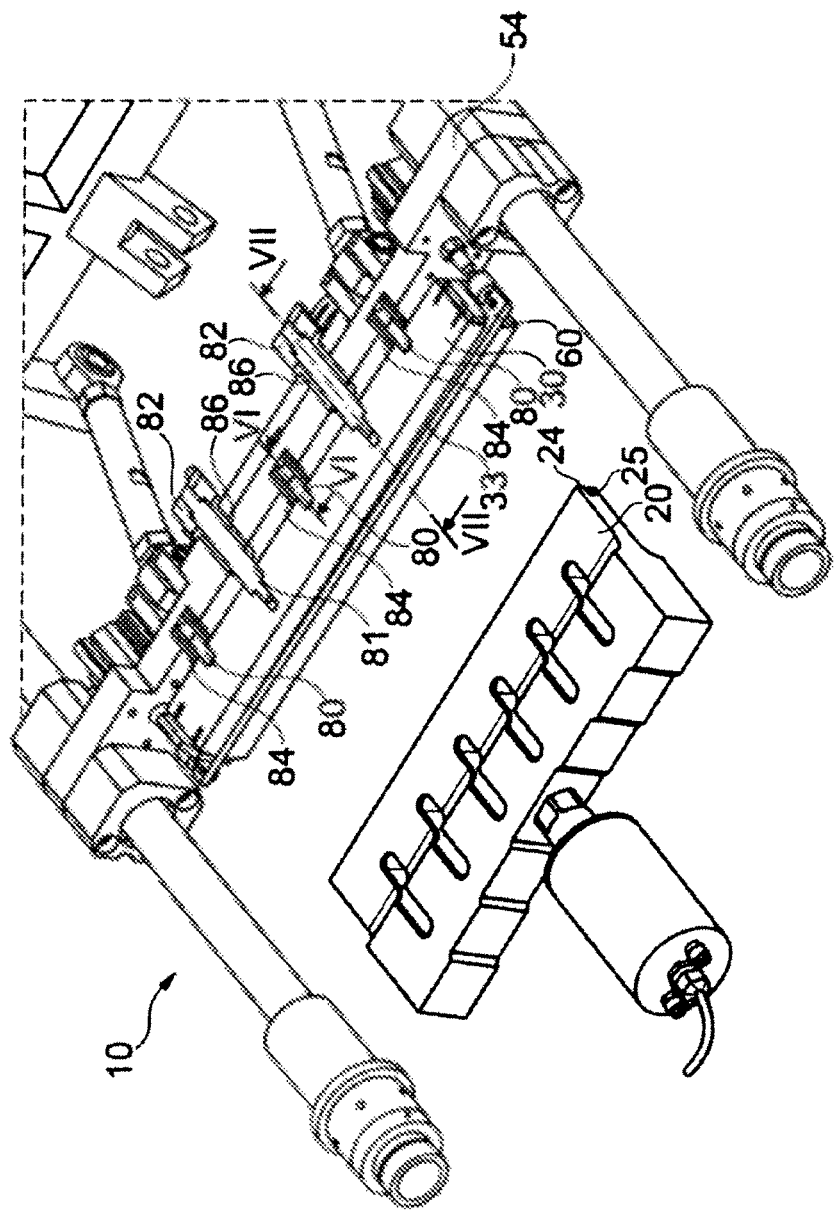
Figure 6:
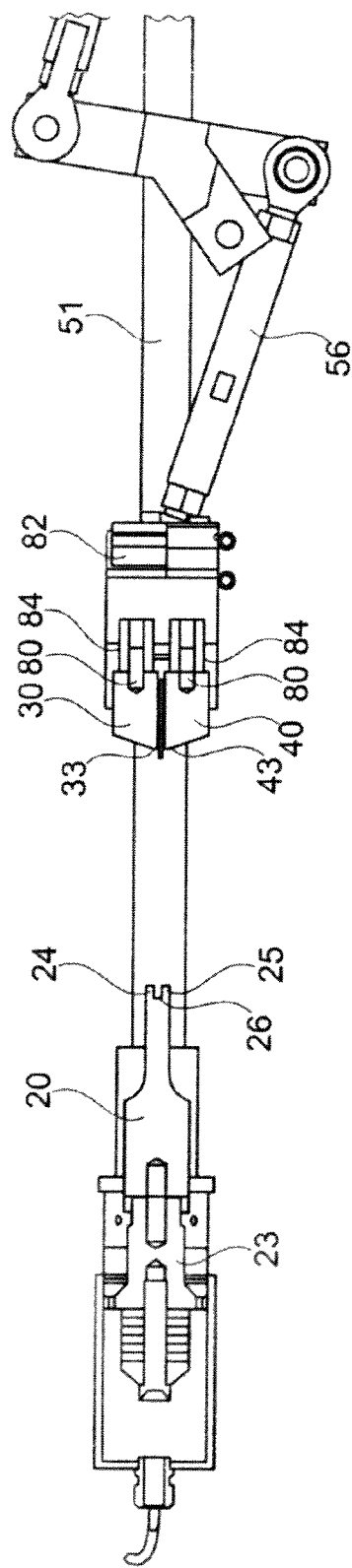
Figure 7:
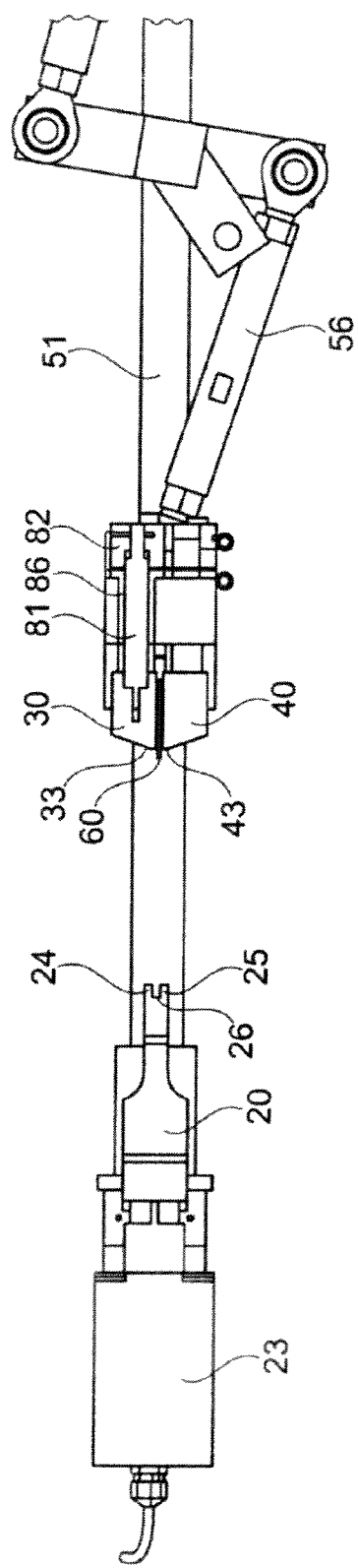
Figure 8:
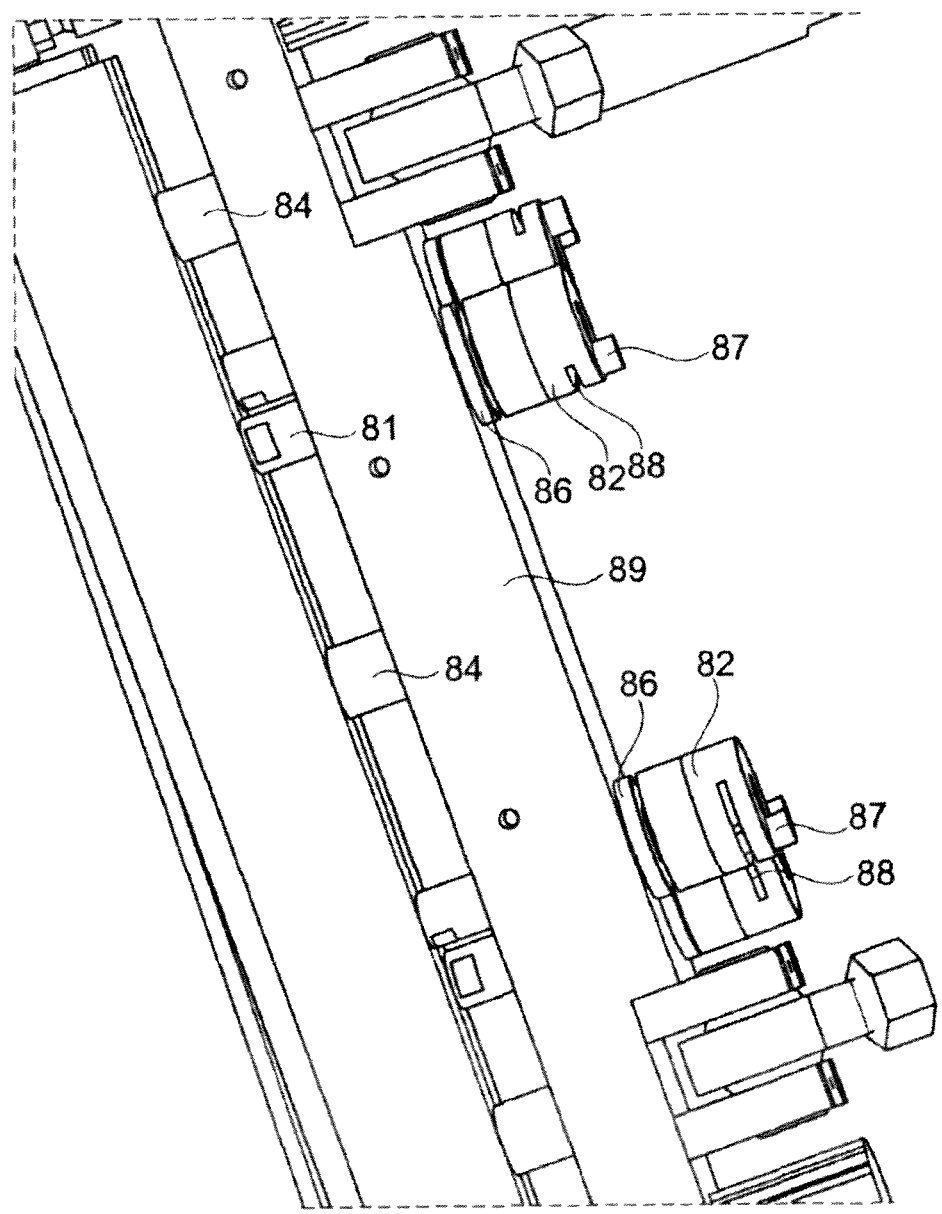
Figure 9:
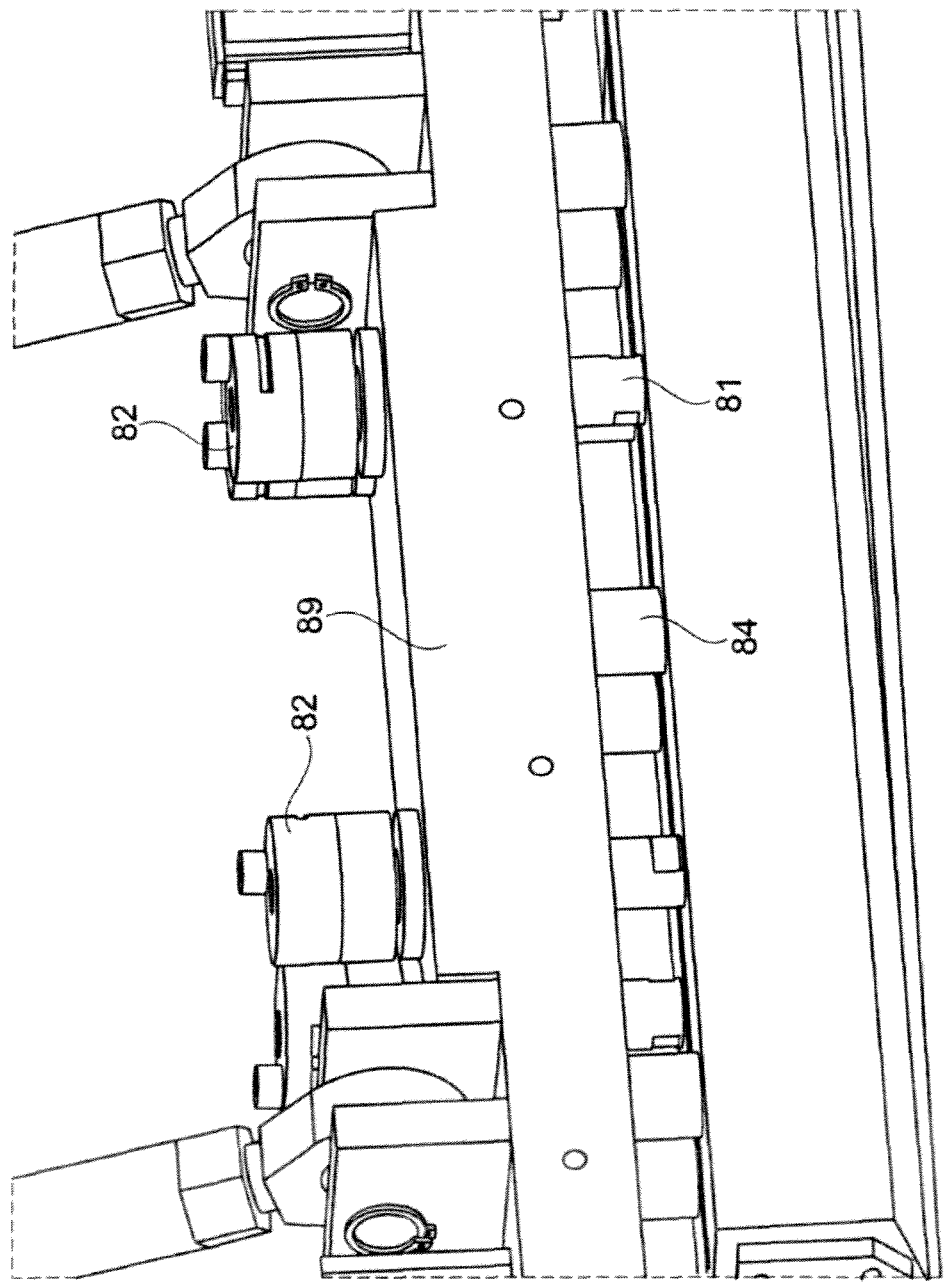
Figure 10:
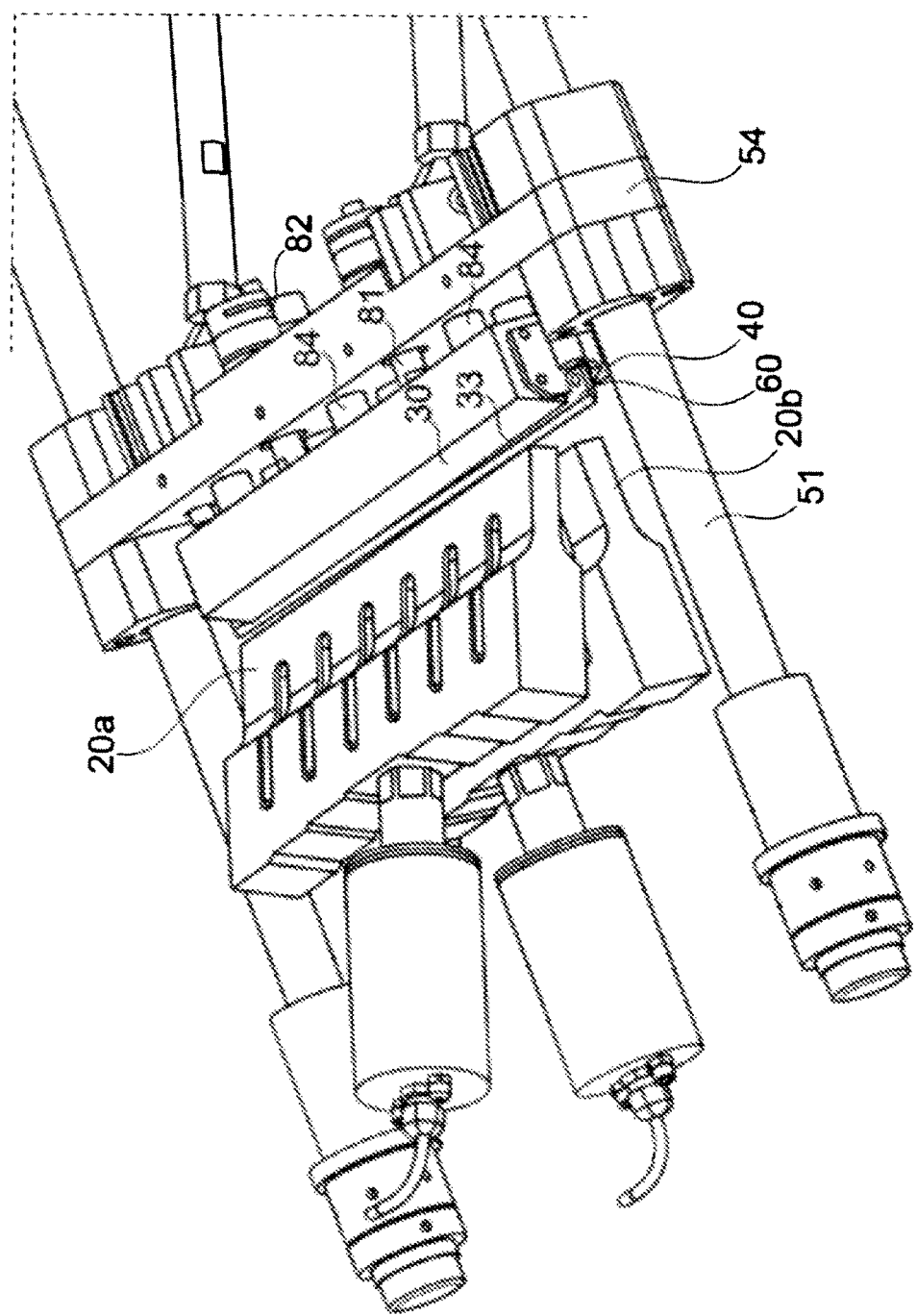
Figure 11:
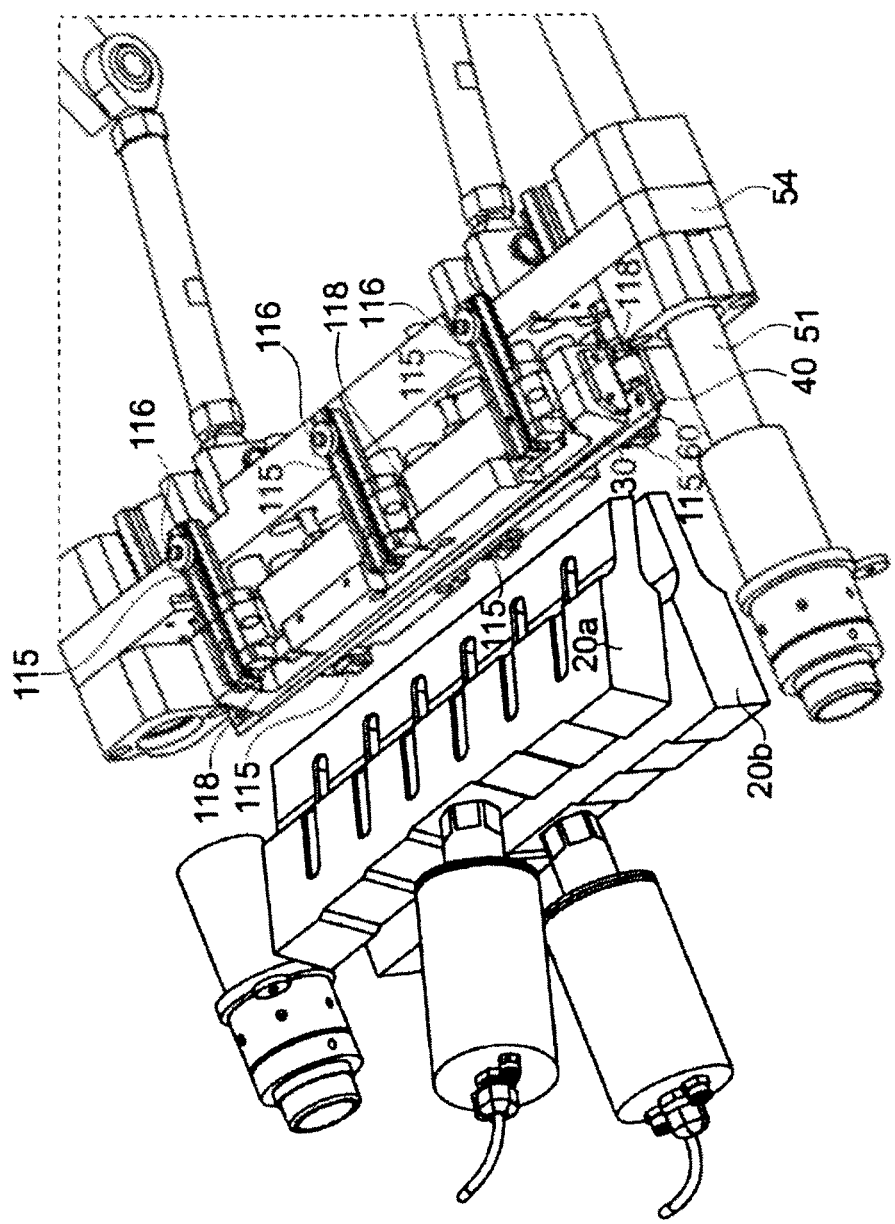
Figure 12:
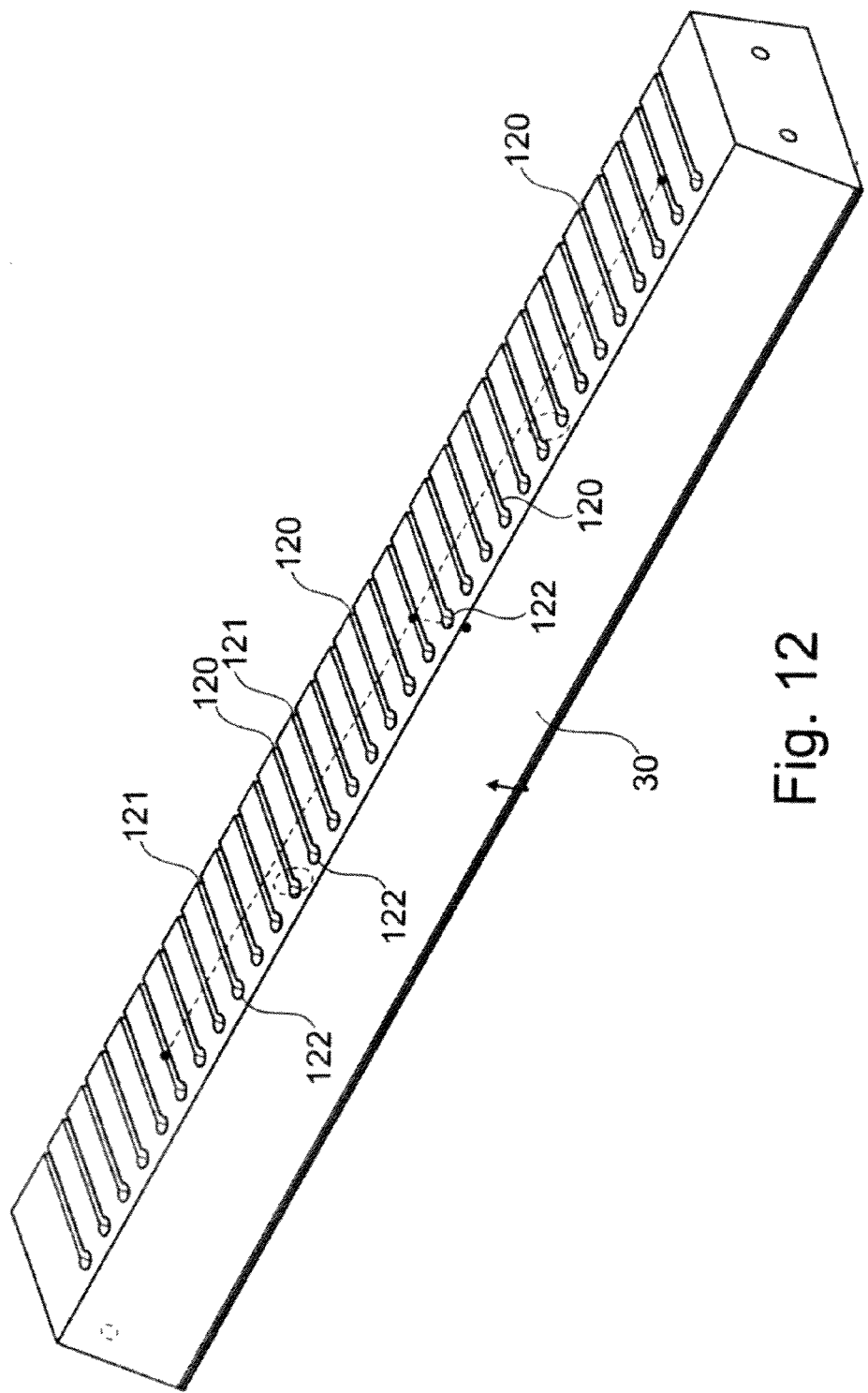

The invention may be better understood by reading the following detailed description of nonlimiting embodiments thereof and examining the appended drawings, in which:

FIG. 1 shows one embodiment of a device in accordance with the invention diagrammatically, from a kinematic point of view, FIG. 2 illustrates the formation of the sachets by rolling and folding a thermoplastic material film on itself, FIG. 3 illustrates different steps in the operation of the device, FIG. 4 represents, diagrammatically and partially, one example of a welding device in accordance with the invention, FIG. 5 represents the device from FIG. 4 partially cut away in the plane of an anvil containing the axis of the guides, FIG. 6 is a sectional view taken along the line VI-VI in FIG. 5, FIG. 7 is a sectional view taken along the line VII-VII in FIG. 5, FIGS. 8 and 9 are two perspective views, partially as if transparent, of constructional details of the device from FIG. 4, FIGS. 10 and 11 are views analogous to FIG. 4 of variant embodiments of the device, and FIG. 12 represents a variant embodiment of an anvil, separately and in perspective As shown in FIG. 1, an ultrasonic welding device 10 in accordance with the invention may include a sonotrode 20 and a set of two anvils 30 and 40 each intended to define a counter-bearing surface when welding a flexible structure and able to move in a direction D, for example downward, between each welding operation.

As shown, the sonotrode 20 and the anvils 30, 40 can advantageously move in the same direction X, which is horizontal, for example, during operation of the device; to this end, the sonotrode 20 is carried by a support structure 28 that can be guided in its movement parallel to the axis X by any suitable guide mechanism 21 and moved by any suitable actuator 22, for example an electric, pneumatic or hydraulic cylinder.

Similarly, the anvils 30 and 40 are carried by a support structure 54 that can be guided by any suitable guide mechanism 51 in its movement along the axis X and can be moved by any suitable actuator 52, for example an electric, pneumatic or hydraulic cylinder.

It is possible to use the same actuator to move the anvils 30 and 40 toward or away from the sonotrode 20.

The actuators 22 and 52 may therefore be replaced by a single actuator and a suitable mechanism for converting the movement of this actuator into cyclic movement of the anvils toward the sonotrode, or vice versa.

The sonotrode 20 is known in itself; it is coupled to any suitable ultrasound generator 23, for example operating at a frequency of the order of 20 kHz.

The sonotrode 20 is made of titanium or aluminum, for example.

The axis of the sonotrode 20 may be parallel to the axis X of movement or alternatively at a non-zero angle thereto.

Each anvil 30 or 40 is mobile relative to the support structure 54 with a possibility of movement relative to the latter in a direction parallel to the axis X, this freedom of movement being provided by a respective guide structure 31 or 41.

As shown, it is advantageous for each anvil 30 or 40 to be mobile in the direction X relative to the support structure 54 against the return action of respective elastic return means 32 or 42, which tend to urge it toward the sonotrode 20.

The movement of each anvil 30 or 40 relative to the support structure 54 may be independent of that of the other anvil, by virtue of a thrust exerted by the sonotrode 20, which tends to deform the corresponding elastic return means 32 or 42.

In accordance with a preferred implementation feature of the invention, each anvil 30 or 40 is also mounted with a possibility of pivoting relative to the support structure 54 in a plane that is perpendicular to the direction D of movement. Each anvil 30 or 40 therefore has two degrees of freedom of movement, one in translation, the other in rotation, which makes it possible for it to be aligned with the sonotrode 20 during the welding operation and to control the force exerted on the flexible structure to be welded.

As shown, the welding device 10 may include a cutting member 60 between the anvils 30 and 40, which cutting member 60 can be actuated independently of the anvils 30 and 40 by its own actuator 61, which makes it possible to move it in the direction of the sonotrode 20 relative to the support structure 54 when the flexible structure must be cut, for example to separate a sachet that has just been closed from the next one.

As shown, the cutting member 60 is preferably guided in movement parallel to the axis X by suitable guide means 62.

The flexible structure that is welded by means of the device 10 is for example, and as shown in FIG. 2, formed from a thermoplastic material film F which is first conformed into a tube and then closed at regular intervals along transverse weld lines.

In the longitudinal direction, the tube may be formed by simple overlapping of two thicknesses of film, or alternatively three thicknesses when one of the edges is folded on itself in the area in which it is superposed on the other edge.

During operation of the device 10, there are made both the weld line $L_{ti}$ for closing the upper opening of a filled sachet $S_i$, the bottom weld $L_{bi}$ of which has previously been produced, and the bottom weld line $L_{bi+1}$ of the next sachet $S_{i+1}$ to be filled.

The opening of a sachet that has just been filled and the bottom of a sachet to be filled are welded simultaneously using the anvils 30 and 40, respectively, and the cutting member 60 is actuated after making the corresponding welds to separate the downstream sachet $S_i$ from the upstream sachet $S_{i+1}$.

When the sonotrode 20 and the anvils 30, 40 are moved toward one another, the flexible structure is clamped between the sonotrode 20 and the front edge 33, 43 of the anvils 30 and 40.

More particularly, in the embodiment shown, the sonotrode 20 has two advanced portions 24 and 25 respectively intended to come to face the edges 33 and 43 and a groove 26 separating the advanced portions 24, 25 in which the blade 64 of the cutting member 60 can be engaged during the cutting operation.

During the welding operation, the anvils 30 and 40 apply to the flexible structure a controlled force that is imposed by the elastic return means 32, 42.

This therefore prevents the exertion of too low or too high a stress on the thicknesses of the film to be welded, which makes it possible to obtain a weld of high quality reproducibly.

Referring to the FIG. 3 diagram, it is seen that the speed of movement of the sonotrode 20 when moving toward the anvils 30, 40 may be negative with a relatively high amplitude in an approach phase and then reduced whilst remaining negative from a so-called docking position, until a final position is reached. The docking position corresponds to the position of changing to the welding speed before the sonotrode and the anvils contact the flexible structure to be welded. During the welding phase, the position of the sonotrode becomes negative, i.e. crosses the median plane, which corresponds in practice to the continued retraction of the anvils 30, 40 relative to the support structure 54 by the thrust exerted by the sonotrode 20. This retraction begins as soon as welding begins and is of greater or lesser extent according to the regularity of the thickness of the flexible structure or the presence of creases or foreign bodies between the two thicknesses of the flexible structure. This retraction occurs against the return action of the associated elastic return means 32, 42.

The ultrasound power increases during the welding phase.

Then, during a "cutter activity" phase, the cutting means 60 are actuated to separate the two weld lines newly formed or to produce a pre-cut.

The reduced negative speed of the sonotrode continues after the end of the welding time, as far as a "stabilization holding" phase, at which it becomes zero.

The cutting member is actuated either during the welding phase or during the stabilization holding phase.

From the end of the stabilization holding phase, the speed of the sonotrode assumes a relatively high positive value, which corresponds to the rapid movement apart of the sonotrode 20 and the anvils 30, 40 and to the launching of a new cycle for the next sachet.

The temperature of the anvils is preferably regulated by circulating a fluid in the anvils or by a heating element such as a heating cartridge 110, as diagrammatically represented in FIG. 1.

One embodiment of the invention has been represented in FIGS. 4 to 9, in which are shown in more detail some of the means described functionally with reference to FIG. 1.

As shown, the guide mechanism 51 includes, for example, two parallel rods on which the support structure 54 can slide, the actuator 52 operating for example via a connecting road and crank mechanism 56 that is shown only in part.

In the example shown, each anvil 30 or 40 is guided relative to the support structure 54 by a set of two guides 81 with parallel axes, sliding in bushes 86. The latter are fixed relative to the support structure 54, being for example, and as shown, fixed in bores in a crossmember 89 of the support structure 54. The guides 81 include adjustable rear stops 82 for adjusting the initial position of the corresponding anvil relative to the support structure 54, from front to rear along the axis X and in rotation in the clockwise or counterclockwise direction about an axis parallel to the direction D of movement of the flexible structure. Each guide 81 may be moved toward the rear relative to the crossmember 89. Its movement toward the front is limited by the stop 82, which comes to bear on the rear face of the crossmember.

It is seen notably in FIGS. 8 and 9 that the adjustment stop 82 may be screwed a greater or lesser distance onto a threaded portion of the guide 81 extending to the rear of the crossmember 89 and immobilized in the chosen angular position by a locking screw 87 that moves parts of the stop separated by a slot 88 toward each other to clamp them onto the guide 81.

The guides 81 are screwed at the front into the corresponding anvil.

By acting on the stops 82, it is possible to adjust the orientation of the anvil when at rest and to retract it to a greater or lesser degree relative to the crossmember; in addition to adjustment of the prestressing of the springs, this makes it possible to preset the parallel relationship between the anvils 30 and 40 and the sonotrode 20.

Coil springs 84 spring-load each anvil 30 or 40 in the direction of the sonotrode 20, as far as a rest position defined by the adjustment of the stops 82 and their coming to bear against the crossmember 89.

Pins 80 fixed to each anvil 30 or 40 hold the springs 84 in place. The latter are disposed between the bottom of a corresponding recess in the crossmember 89 of the support structure 54 and the rear face of the anvil 30 or 40.

Each anvil 30 or 40 is guided by the guides 81 and bushes 86 with sufficient radial play to allow angular movement of the anvil in a plane that is substantially perpendicular to the direction D of movement of the flexible structure.

This play is for example from 0.05 to 0.2 mm for a guide diameter of 15 mm.

In the example considered here, one of the springs 84 has its axis in the median plane of the corresponding anvil. The other two are disposed symmetrically with respect to this plane, and likewise the two guides 81.

The travel of the anvil 30 or 40 relative to the support structure 54 allowed by the springs 84 is between 0.1 and 10 mm, for example.

The distance between the front edges 33, 43 of the anvils 30, 40 during a welding operation is between 2 and 40 mm, for example, better between 6 and 8 mm. This distance corresponds to the distance between the weld lines that are produced.

The length of each anvil 30 or 40 is between 10 and 500 mm, for example.

In a variant, shown in FIG. 10, the device includes two sonotrodes 20a and 20b each associated with a respective anvil 30 or 40.

Each anvil 30 or 40 may be mobile relative to the support structure 54.

Alternatively, the anvils 30 or 40 are fixed relative to the support structure 54 and it is the sonotrodes 20a and 20b that are mobile relative to each other thanks to a suitable mechanism that is not shown so that each airgap defined between a sonotrode and the corresponding anvil is able to adapt to the flexible structure present in the airgap. This amounts to a kinematic reversal relative to the situation in which it is the anvils that are mobile relative to the support structure.

Each sonotrode 20a or 20b can therefore be mounted with a possibility of movement relative to an associated support structure, not shown, in a plane parallel to the corresponding weld line, preferably with two degrees of freedom, one in translation and the other in rotation.

The sonotrodes 20a and 20b extend along respective axes one of which may be parallel to the direction of movement of the sonotrode during its movement toward the anvil to carry out the welding operation and the other at an acute angle, preferably less than 60°, to that axis.

Generally speaking, it may be beneficial to limit the upward or downward relative movement of the anvils 30 and 40 whilst allowing the required lateral relative movement, enabling each anvil to retain two degrees of freedom of movement relative to the support structure 54.

The use of recirculating-ball carriages rather than guide bushes is preferable in this respect.

The use of recirculating-ball carriages is shown in FIG. 11. Although this embodiment concerns a variant of the device from FIG. 10 with two sonotrodes 20a and 20b, the following description is valid for the embodiment shown in FIGS. 1 to 9 with a single sonotrode 20 and two anvils 30 and 40.

The guidance is effected by means of rails 115 that are fixed to the support structure 54, notably by means of screws 116. These rails 115 are parallel to each other and, as shown, there are preferably three of them per anvil, with a central rail and two lateral rails. The latter are preferably symmetrically disposed with respect to each other relative to the axis of the central rail.

Each anvil carries recirculating-ball carriages 118 the balls of which circulate on the rails 115. Generally speaking, the front edge 33 or 43 of each anvil may have any suitable shape appropriate to the weld to be effected and have a more or less beveled or rounded shape.

The two anvils 30 and 40 are preferably mobile relative to the support structure 54, but alternatively only one of them is.

The coil springs 84 may be replaced by any other elastic return members, for example gas cylinders or leafsprings, or by one or more electric actuators, for example.

One of the anvils may be mobile relative to the other anvil and carried thereby.

As shown in the figures that have just been described, the mobility of each anvil 30 or 40 is preferably achieved by suitably guiding the anvil as a whole, which moves as a whole in a non-deformable manner. It is nevertheless possible to use anvils that are at least in part elastically deformable so as to allow the front edge of the anvil to be mobile relative to the rest of the anvil, which may be fixed relative to the support structure. In this case, the partial retraction of the anvil by the thrust exerted by the sonotrode may be obtained by local deformation of the anvil.

FIG. 12 represents an example of such an anvil 30.

It is seen in this figure that the anvil may include a succession of parallel slots 120 that open at one end 121 onto the rear face of the anvil and at the opposite end into a hole 122. The slots 120 and holes 122 extend the full height of the anvil. The presence of the slots confers some deformability on the anvil in a plane parallel to the weld line and perpendicular to the direction of movement of the flexible structure in the airgap.

The deformation of the anvil may occur within the limits of the elasticity of the material of the anvil, so that the deformation is reversible.

The thickness of material between the holes 122 in the front face of the anvil is chosen as a function of the required deformability.

The anvil may be mounted so as to be retracted with an overall movement in translation by the thrust exerted by the sonotrode. In this case, the deformability conferred by the presence of the slots reduces the usefulness of the two degrees of freedom in the guidance of the anvil relative to the support structure; a single degree of freedom in movement in translation from front to rear suffices.

The device need not include a cutting tool disposed between the two anvils. In this case, the sonotrode is produced with a blade engaging between the two anvils and serving as a cutting tool, for example.

Various types of film may be used, for example those listed in the table below.

| Type | Materials |
| --- | --- |
| Singe-layer | PE |
| | PET |
| | PP |
| | PEHD |
| Complex | OPA/PP |
| | OPA/PE |
| | OPA/OPP |
| | OPET/PE-EVOH-PE |
| | PET/OPA/PP |
| | PET/ALU/PP |
| | PET/ALU/PE |
| | PET/PE |
| | PET/PP |
| | PAO/EVE |
| | PAO/EVM |
| | PAO/PEH |
| | PAO/PP |
| | PAO/PE |

Unless otherwise indicated, the expression "including a" must be understood as synonymous with "including at least one".

What is claimed is:

1. Device for ultrasonic welding of a flexible structure, to be conformed into sachets, this device including at least two airgaps each defined between a sonotrode and an anvil carried by respective support structures the distance between which varies between a close together welding position and a spaced apart flexible structure movement position, in which airgaps the flexible structure to be welded is intended to be received to produce at least two weld lines, wherein for each airgap an anvil and/or a sonotrode both associated with this airgap is at least partially mobile relative to a support structure of this anvil or sonotrode, the two anvils being movable independently of each other.

2. Device according to claim 1, the sonotrode(s) and the anvil(s) being simultaneously and cyclically mobile in a direction substantially perpendicular to a direction of movement of the flexible structure within the device between a spaced-apart position allowing movement of the flexible structure and a close together welding position.

3. Device according to claim 1, at least one of the anvils being fastened to a support structure, moved by a mechanism in translation in a direction moving it toward or away from the sonotrode and each of the anvils being fastened to a support structure moved by a mechanism in translation in a direction toward or away from the sonotrode.

4. Device according to claim 1, the two airgaps being defined by the same sonotrode and by respective anvils.

5. Device according to claim 1, the sonotrode having two advanced portions facing respective front edges of the sonotrodes and separated by a groove.

6. Device according to claim 1, an anvil and/or a sonotrode together defining an airgap, being free to pivot, in a plane perpendicular to a direction of movement of the flexible structure within the device.

7. Device according to claim 1, the or each anvil and/or sonotrode being free to pivot in a plane perpendicular to a direction of movement of the flexible structure within the device, the pivoting being accompanied by the deformation of at least one elastic return member toward a rest position.

8. Device according to claim 6, the possibility of pivoting of the or each anvil and/or the or each sonotrode being obtained by virtue of play in the guidance of the or each anvil and/or the or each sonotrode.

9. Device according to claim 8, the possibility of pivoting being obtained by virtue of play between rails and recirculating-ball carriages moving on these rails.

10. Device according to claim 1, including at least one elastic return member for urging the anvil and the sonotrode associated with the same airgap toward each other.

11. Device according to claim 10, at least one of the anvils, being spring-loaded in the direction of the same sonotrode by at least two return springs, disposed on either side of a median plane of the anvil.

12. Device according to claim 10, including means for adjustment of a rest position into which the anvil or the sonotrode is urged by the elastic return member(s) when the sonotrode and the anvil are spaced apart between two welding operations.

13. Device according to claim 1, including at least part of a cutting device between the two anvils.

14. Device according to claim 1, each anvil being temperature-regulated, by circulation of a fluid in at least one passage internal to the anvil.

15. Device according to claim 1, at least one of the anvils including a succession of slots conferring flexibility on it.

16. Device for ultrasonic welding of a flexible structure, including:
   a sonotrode,
   two anvils carried by a support structure, this support structure being mobile relative to the sonotrode between a spaced-apart position and a close-together position, at least each one of the anvils being mobile relative to the support structure and caused to move relative to the latter by a thrust exerted by the sonotrode when the support structure is in the close-together position, and each anvil is movable relative to the support structure by said thrust, the movement of the anvil(s) relative to the support structure occurring against the return action of at least one elastic return member, each anvil having one degree of freedom of movement in translation and one degree of freedom of movement in rotation, the two anvils being movable independently of each other.

17. Method for ultrasonic welding of a flexible structure by means of a device according to claim 1, wherein two parallel weld lines are effected simultaneously with the structure to be welded clamped in each airgap between the sonotrode and the corresponding anvil.

18. Method according to claim 17, the flexible structure being formed of a thermoplastic material film, the thickness of the film being between 10 and 100 microns.

19. Method according to claim 17, the sachet containing notably salad leaves or raw vegetables or a powder product.

20. Method according to claim 17, each anvil, being moved relative to a support structure of these anvils by a thrust exerted by the sonotrode during the production of the weld lines.

21. Method according to claim 17, the temperature of the anvils being regulated.

* * * * *